3,042,865
METER PROTECTION CIRCUIT
Grant F. Stetzler, Temple, Pa., assignor to Western Electric Company, Incorporated, New York, N.Y., a corporation of New York
Filed Jan. 12, 1959, Ser. No. 786,343
2 Claims. (Cl. 324—110)

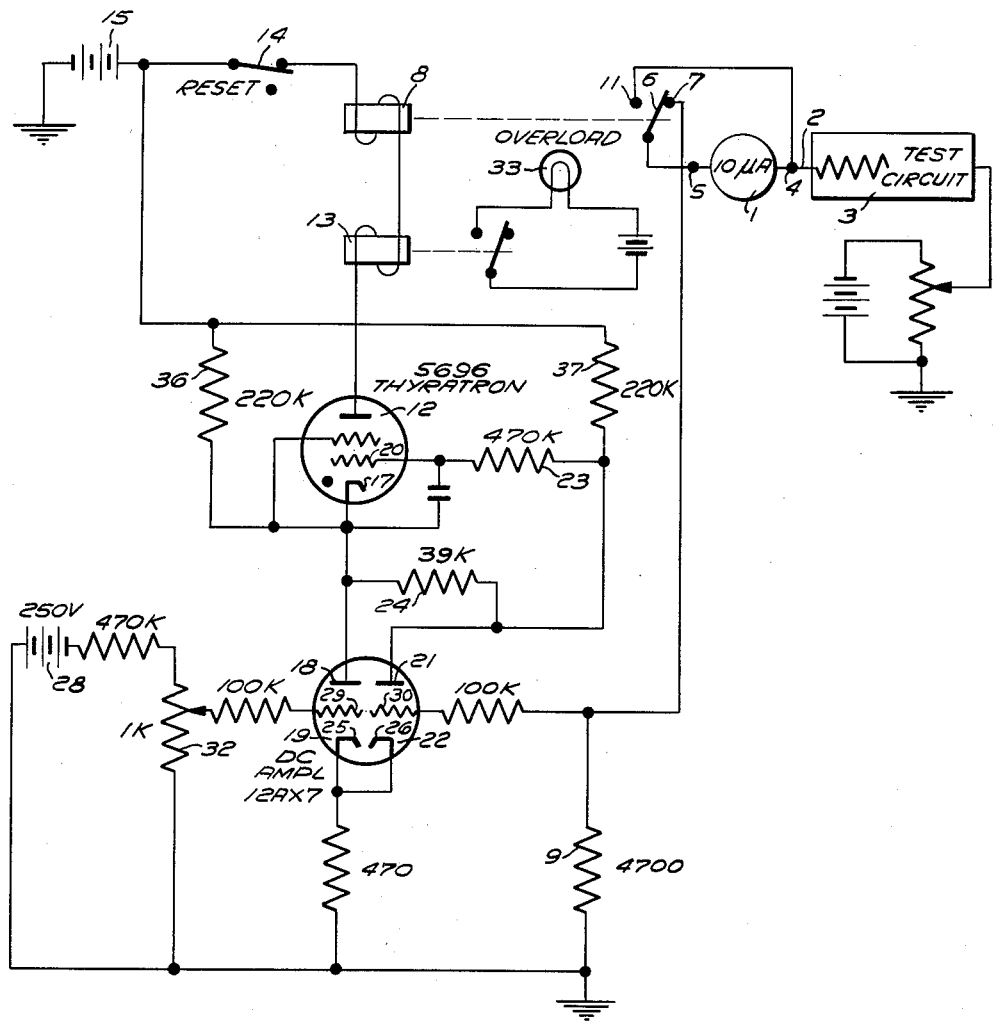

This invention relates to an electric meter protection circuit and has for its object the protection of meters used for measuring extremely small currents.

According to the general features of the invention, a meter shunting circuit is closed by the firing of a gas tube, the firing potential being obtained between the plates of two triodes. The cathodes of the triodes are connected together in a common circuit and a static bias is applied to one of the triodes while the meter current biases the other. Due to the common cathode connection decreasing plate current in one of the triodes causes an increased current in the other; consequently, the potential of one of the plates increases while that of the other decreases. With an overload condition the variable bias is sufficient to increase the potential difference between the two plates so as to fire the gas tube and thereby close the meter shunting circuit before the meter is damaged.

These and other features of the invention will be more clearly understood from the following detailed description when taken in conjunction with the accompanying drawing of a transistor test system showing a schematic diagram of a circuit for protecting a ten microampere meter.

Referring now to the drawing, reference numeral 1 designates a ten microampere meter for measuring current in conductor 2 of a test circuit 3 serially connected to terminal 4 of the meter. The other meter terminal 5 is connected to ground through the armature 6 and normally closed contact 7 of a fast-acting mercury relay 8 and a 4700 ohm resistance element 9. A meter shunting circuit is provided between meter terminals 4 and 5 through the contact 11, and armature 6 when the relay is operated, contact 11 being normally open. Operation of relay 8 then automatically opens the test circuit, thereby protecting delicate elements, such as transistors, in the test circuit 3 from excessive currents. Since the relay 8 is of the mercury relay type, the mercury near the top of contact 6 on operation of that contact momentarily bridges contacts 7 and 11 before it actually opens contact 7. Thus, a momentary short-circuit, to ground, through resistor 9, exists about the ammeter prior to the actual breaking of the current path extending through the test circuit.

The operate winding of relay 8 is connected in the anode circuit of a 5696 type thyratron 12. This relay may be of the type used for sixty-cycle alternating current applications having an operate time of less than sixteen milliseconds. This operate time is substantially shorter than the response time of the meter which may be in the order of one to two seconds. Anode potential for the thyratron 12 is obtained from a source 15 through the winding of an indicator operating mercury relay 13, the winding of relay 8, and a normally closed "Reset" switch 14. The cathode 17 is connected directly to the plate 18 of a first triode 19 while the control electrode 20 is connected to the plate 21 of a second triode 22 through a 470,000 ohm resistance element 23. The potential difference between the plates appears across a 39,000 ohm resistance element 24 so that variations in the potentials between plates 18 and 21 change the potential difference between cathode 17 and the control electrode 20 of the thyratron. A static bias on the thyratron (from source 15 and the 220,000 ohm resistance elements 36 and 37) is not sufficient to fire the tube. A decrease in the plate current of triode 22 increases the positive potential on plate 21. This increased positive potential together with the positive static bias is sufficient to fire the thyratron which remains conducting until the plate circuit is opened with reset switch 14.

Triodes 19 and 22 form a direct current amplifier and may be separate tubes or may be housed in a single envelope such as the 12AX7 disclosed in the drawing. The cathodes 25 and 26 are connected together to one end of a 470 ohm resistance element 27, the other end being connected to the grounded end of a static bias source 28 for grid 29 of triode 19. Grid 30 of triode 22 is negatively biased by the current through conductor 2 and meter 1, being connected to the off-ground end of resistance element 9 in the meter current path.

The tripping point of this overload circuit, that is, the point at which the thyratron 12 will fire and the meter shunting circuit actuating relay 8 will be operated, is controlled by the static bias on grid 29 of the triode 19. This bias may be adjusted to any desired value by making an adjustment in the potentiometer 32. Normally this tripping point is about one and a half to two times the full scale deflection of the meter which will not damage the meter. In operation then, as soon as the meter currents exceeds the limiting value, the plate current in triode 22 immediately decreases, causing the plate current in triode 19 to increase so that the potential difference developed across resistor 24 becomes sufficiently large to fire the thyratron 12 and operate the fast-acting mercury relays 8 and 13 which, in turn, operate to close the meter shunting circuit and the indicator circuit 33. The response time of the direct current amplifier and thyratron for an overload is substantially instantaneous so that the relatively slow moving indicator of the meter 1 will not be actuated sufficiently to cause damage thereto. For example, in the case of a substantially instantaneous increase in current from zero to a value in excess of the limit value, the indicator would barely leave the zero mark by the time the shunting circuit is established. The voltage drop resulting from the meter current in the grid bias resistance element 9 is negligible, being in the order of that of the meter 1 itself.

The thyratron provides a definite "on" or "off" relay action as compared to prior art relay shunting overload circuits wherein the meter current partially energizes the relay winding for meter currents less than the overload value. Furthermore, once triggered, the thyratron remains conducting to hold the relays 8 and 13 operated even though the operating or triggering voltage is removed by the opening of the test circuit 3 by the opening of contact 7 when the armature 6 of the relay is operated. When desired, the thyratron is reset and the relays 8 and 13 released by opening the thyratron anode circuit by opening "Reset" switch 14.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A protective system for a current sensitive electric meter comprising a gas tube having at least an anode, cathode, and a control electrode, a source of anode potential for the gas tube, a fast-operating mercury relay having an actuating winding and a contact tongue operable between a normally closed contact in a current path in series with the meter and a normally open contact connected to a circuit adapted to shunt the meter on operation of the relay, means connecting the anode to the source through the winding of the relay, a pair of triodes, means for statically biasing one of the triodes, means responsive to the current in the meter for biasing the other triode, and means for applying the potential difference between the plates of the triodes between the cathode and control electrode of the gas tube, on occurrence of an overload current through the meter the potential difference being such as to cause the gas tube to operate the mercury relay, on operation of the relay the contact tongue being adapted to shunt currents across the meter through the shunt circuit before the current path in series with the meter is broken.

2. A system according to claim 1 in which the triodes have a common cathode resistance element and the means for biasing said other triode comprises a resistance element in series with the meter so that current therein negatively biases said triode, the static bias being of a value to cause the gas tube to fire and operate the relay when a predetermined overload current is in the meter.

References Cited in the file of this patent
UNITED STATES PATENTS

| | | |
|---|---|---|
| 2,509,027 | Zimmermann | May 23, 1950 |
| 2,531,118 | Edwards | Nov. 21, 1950 |

OTHER REFERENCES

Publication, "Short-Circuit Protection for Meter," by P. Koustas of the Tube Div. R.C.A., at pages 90, 92 and 94 in Radio and Television News, June 1955.